July 27, 1943.  F. E. BEST  2,325,099

HIGH SPEED ROLLER BEARING

Filed Sept. 23, 1940

Frank Ellison Best.

INVENTOR.

Patented July 27, 1943

2,325,099

UNITED STATES PATENT OFFICE 2,325,099

HIGH-SPEED ROLLER BEARING

Frank Ellison Best, Indianapolis, Ind.

Application September 23, 1940, Serial No. 357,907

4 Claims. (Cl. 308—205)

My invention relates to high speed roller bearings and my present invention is in the nature of an improvement on the high speed roller bearing disclosed in my co-pending patent application Serial Number 291,635 filed August 24, 1939.

An object of this invention is to provide a bearing of this type which can be quickly and easily assembled without distortion of any of the parts and without requiring special tools and apparatus for purposes of assembly.

Another object of this invention is to simplify the construction, increase the efficiency and reduce the cost of production of roller bearings of this type.

Other objects will be apparent from the following description taken in connection with the accompanying drawing.

In the drawing Figure 1 is a diametrical cross section of this roller bearing taken substantially on broken line 1—1 of Figure 2.

Like reference numerals designate like parts throughout the several views.

Figure 1:
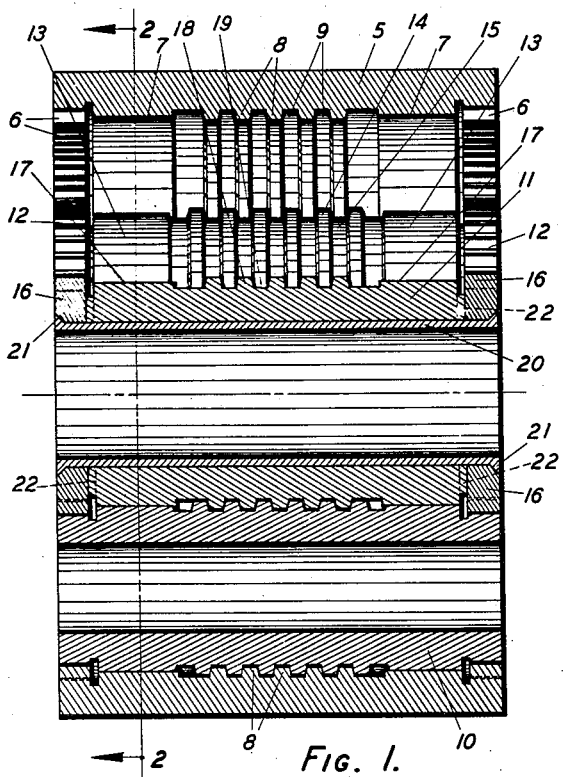
Figure 2:
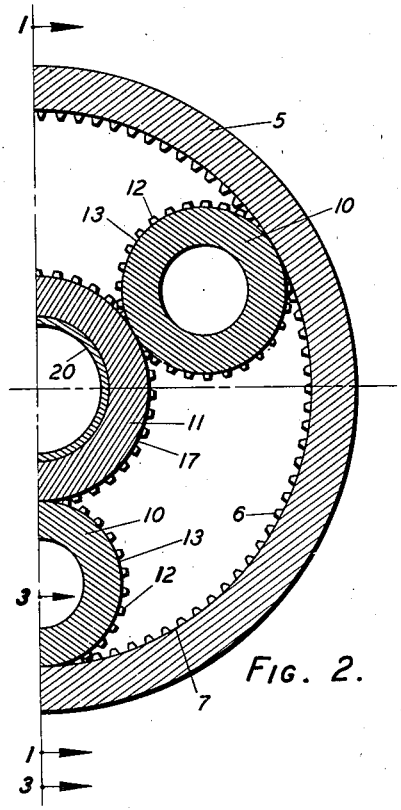
Figure 2 is a cross section of the bearing taken substantially on broken line 2—2 of Figure 1, and showing one half of the bearing.
Figure 3:
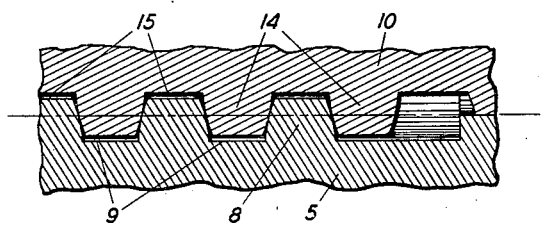
Figure 3 is an enlarged fragmentary sectional view taken substantially on broken line 3—3 of Figure 2 and showing end thrust means.

Referring to the drawing, 5 designates an outer cylindrical race member that is provided near each end with an internal gear 6. Two bearing surfaces 7 are provided just inwardly from the internal gears 6. Spaced apart annular ribs 8 having annular grooves 9 therebetween are provided in the outer race member 5 between the two bearing surfaces 7 and 8.

A plurality of tubular bearing rollers 10 are operatively disposed within the outer race member 5. An inner race member 11 is centrally positioned within the outer race member 5 and the rollers 10 also bear on and cooperate with this inner race member 11. Three bearing rollers 10 are herein shown. This provides for a three line bearing and is a desirable number of rollers to use because it insures that equal loads will always be taken by each roller. However more than three of the bearing rollers 10 may be used if desired.

Each bearing roller 10 has external gears 12, bearing surfaces 13 and annular ribs 14 with annular grooves 15 therebetween. The parts 12, 13, 14 and 15 are adapted to cooperate with the corresponding parts 6, 7, 8 and 9 of the outer race member 5. Also these parts 12, 13, 14 and 15 of the bearing rollers are adapted to cooperate with separable gears 16, bearing surfaces 17, annular ribs 18, and annular grooves 19 of the inner race member 11. The gears 16 of the inner race member 11 are made separable from this race member 11 to make possible the assembly of the bearing.

The separable gears 16 are mounted on a tubular sleeve member 20 that extends through the inner race member 11 and protrudes from the ends thereof. End portions 21 of the sleeve member 20 are upset or expanded to secure the separable gears 16 on the tubular sleeve 20. To lock the separable gears 16 and the inner race member 11 against relative rotation interlocking tooth or key means 22 of tongue and groove type is provided on each end of the inner race member 11 and on the abutting face of the adjacent separable gear 16.

The sleeve 20 fits tightly within the inner race member 11 and the separable gears 16 fit tightly on said sleeve and after the parts 11, 20 and 16 are completely assembled they remain rigid relative to each other.

In the assembly of this bearing the tubular rollers 10 are first all placed within the outer race member 5 on one side of an axial plane thereof. These rollers 10 are of a size so that, when they are thus placed close together, the centers of all of the rollers of the group will be on the same side of a longitudinal plane that passes through the axis of the bearing. The inner race member, minus the gearwheels 16, is then inserted through one end of the outer race member into the open portion thereof in a position opposite the grouped tubular rollers 10 and, after insertion, is moved toward the rollers 10 until it is in contact therewith and substantially coaxial of the outer race member. The rollers 10 are then moved around the inner race member within their chamber until they are properly positioned at equidistant angular intervals. As the rollers are moved around within their chamber to properly position them they will roll within the outer race member 5 because of engagement of the gears 6 and 12 and at the same time will slide on the inner race member while being positioned. In this way the rollers may be properly positioned and may be placed under some pressure if desired to insure smooth and silent operation. The sleeve 20 may be placed in the inner race member 11 either before or after said race member 11 is placed in the bearing. After the inner race member 11 and bearing rollers 10 have been properly positioned in the outer race member 5, the separable gearwheels 16 are fitted over the projecting ends of the sleeve 20 with their gear teeth properly meshed with the teeth on the gears 12 of the rollers 10 and the interfitting key means 22 of the race 17 and gears interlocked. The gearwheels 16 are then staked onto the tubular member 20 by upsetting the end portions of the tubular members leaving the bearing completely assembled and ready for operation.

The interfitting annular thrust ribs 9, 14 and 19 preferably have substantially the cross section of rack teeth with curved and tapered sides and the points of contact of said ribs are coincident with the circumferences of the bearing surfaces where the rollers 10 roll on the race members 5 and 11, thus providing for complete rolling contact and avoiding friction.

The pitch circles of the enmeshed gear teeth of the rollers and race members are coincident with the bearing surfaces of said rollers and race members, thus eliminating substantially all friction in the gear teeth. The enmeshed gear teeth maintain the proper alignment and spacing of the rollers.

The bearing rollers 10 are tubular. The walls of these rollers are heavy enough to carry the load for which the bearing is designed. However, the rollers 10 have some resiliency and for this reason can be assembled under enough pressure to insure a tight, smooth running fit and quiet operation at high speeds. This tightness of fit is maintained irrespective of changes of temperature, within the normal operating temperature range of the bearing, due to the resiliency of the rollers 10. The rollers 10 are light in weight, due to their tubular construction. This minimizes the undesirable effect of centrifugal force in a high speed bearing.

Having described my invention, what I claim and desire to protect by Letters Patent is:

1. In a geared roller bearing, an outer race member, an inner race member of smaller diameter than the outer race member adapted to be positioned within the outer race member, a tubular sleeve within said inner race member extending beyond the ends thereof to provide gear receiving portions, a plurality of bearing rollers adapted to be disposed between said two race members in angularly spaced apart relation, said rollers being of a size and number to provide for positioning all of said rollers within the outer race member with all of their axes within substantially a semi-circle while the inner race member is being inserted therein, internal gears adjacent the ends of the outer race member, gears on said rollers adapted to mesh with said internal gears, separable gears for the end portions of said inner race member carried by said gear receiving end portions of said tubular sleeve and adapted to mesh with the gears on said rollers, interfitting tongue and groove means on the end portions of said inner race members and the sides of said separable gears, and upset portions on the ends of said tubular sleeve rigidly securing said separable gears to said tubular sleeve, said upset portions providing for securing at least one of said separable gears to said inner race member after said race members and said rollers have been properly positioned relative to each other to thereby complete the assembly of the bearing.

2. In a geared roller bearing, an outer race member, an inner race member of smaller diameter than the outer race member adapted to be positioned within the outer race member, a tubular sleeve within said inner race member extending beyond the ends thereof to provide gear receiving portions, a plurality of bearing rollers adapted to be disposed between said two race members in angularly spaced apart relation, roller bearing surfaces provided on said outer and said inner race members and on said rollers adjacent the respective ends thereof, annular ribs provided on said outer and said inner race members and on said rollers between the roller bearing surfaces thereof, internal gears rigid with the outer race member adjacent the ends thereof, gears rigid with the end portions of said rollers adapted to mesh with said internal gears, separable gears for the end portions of said inner race member carried by said gear receiving end portions of said tubular sleeve and adapted to mesh with the gears on said rollers, and upset portions on the ends of said sleeve securing said separable gears to said inner race member at least one of said upset portions being adapted to be formed after said race members and said rollers have been properly positioned relative to each other to thereby complete the assembly of the bearing.

3. In a geared roller bearing, an outer tubular race member, an inner tubular race member of smaller diameter than the outer race member adapted to be positioned within the outer race member, a plurality of bearing rollers adapted to be disposed between said two race members in angularly spaced apart relation, internal gears rigid with the end portions of the outer race member, other gears rigid with the end portions of said rollers adapted to mesh with said internal gears, coaxial tubular extensions on the end portions of said inner race member, separable gears adapted to fit over said extensions, key means adapted to lock said separable gears to said inner race member, and means adapted to secure at least one of said separable gears to said tubular extensions after said race members and said rollers have been properly positioned relative to each other to thereby complete the assembly of the bearing.

4. In a geared roller bearing, an outer race member, a plurality of bearing rollers adapted to be positioned within said outer race member in closely adjacent relation, said rollers being of a size and number so that when all of said rollers are positioned in closely adjacent relation in said outer race member their axes will all be at one side of a diametrical plane of said outer race member, an inner race member adapted to be inserted into said outer race member at the side thereof opposite said bearing rollers when the bearing rollers are in closely adjacent relation, whereby after the inner race member has been inserted into the outer race member it may be moved sidewise into a central position within the outer race member and the rollers angularly positioned at equal distances therearound, annular ribs on said outer and inner race members and on said bearing rollers adapted to interfit upon assembly, and gear members on said outer and inner race members and said rollers adapted to mesh when the bearing is assembled, at least one of the gear members on the inner race member being adapted to be secured to the inner race member after the other parts of the bearing have been properly positioned.

FRANK ELLISON BEST.